Jan. 7, 1936.  J. H. DEVINE  2,026,967
LUNCH BOX
Filed Nov. 25, 1932   3 Sheets-Sheet 1

Inventor:
James H. Devine
By Brown, Jackson, Boettcher & Dienner
Attys.

Jan. 7, 1936.  J. H. DEVINE  2,026,967
LUNCH BOX
Filed Nov. 25, 1932   3 Sheets-Sheet 2
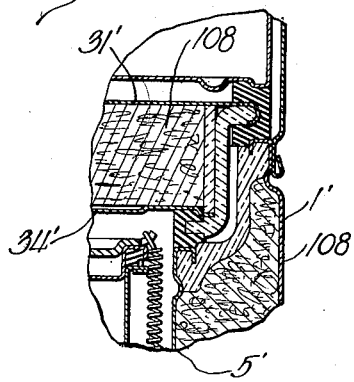
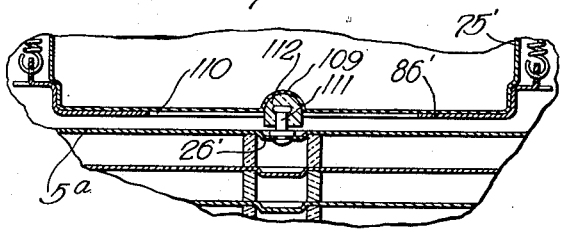
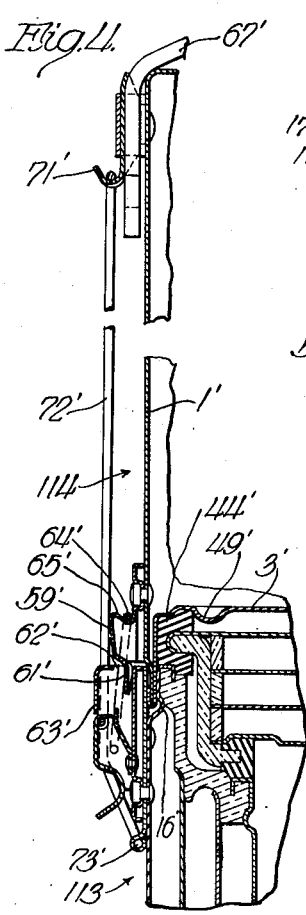
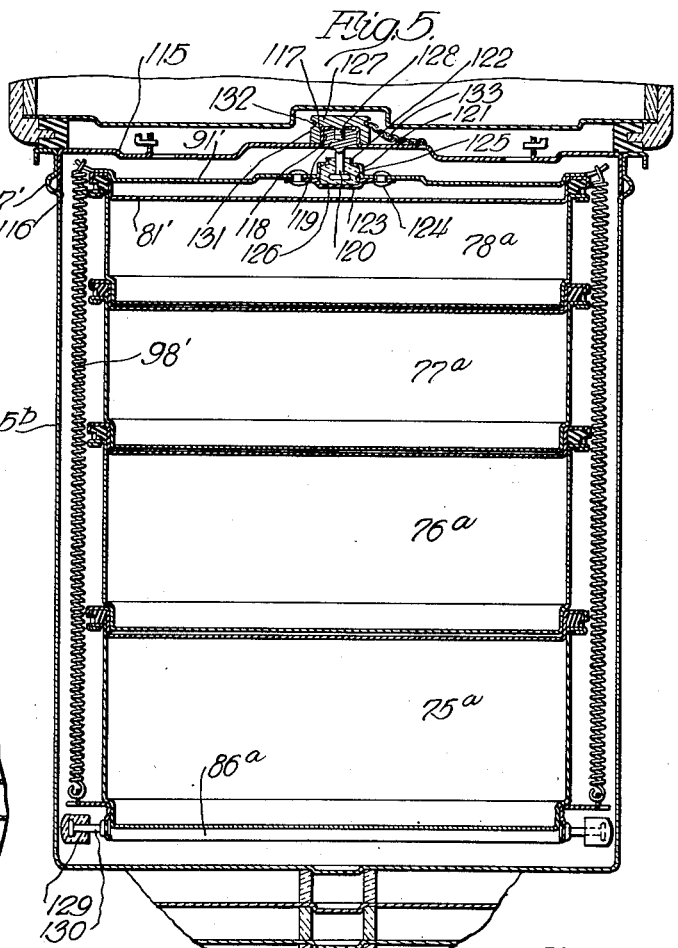
Inventor:
James H. Devine
By Brown, Jackson, Boettcher & Dienner
Attys.

Jan. 7, 1936.  J. H. DEVINE  2,026,967
LUNCH BOX
Filed Nov. 25, 1932   3 Sheets-Sheet 3
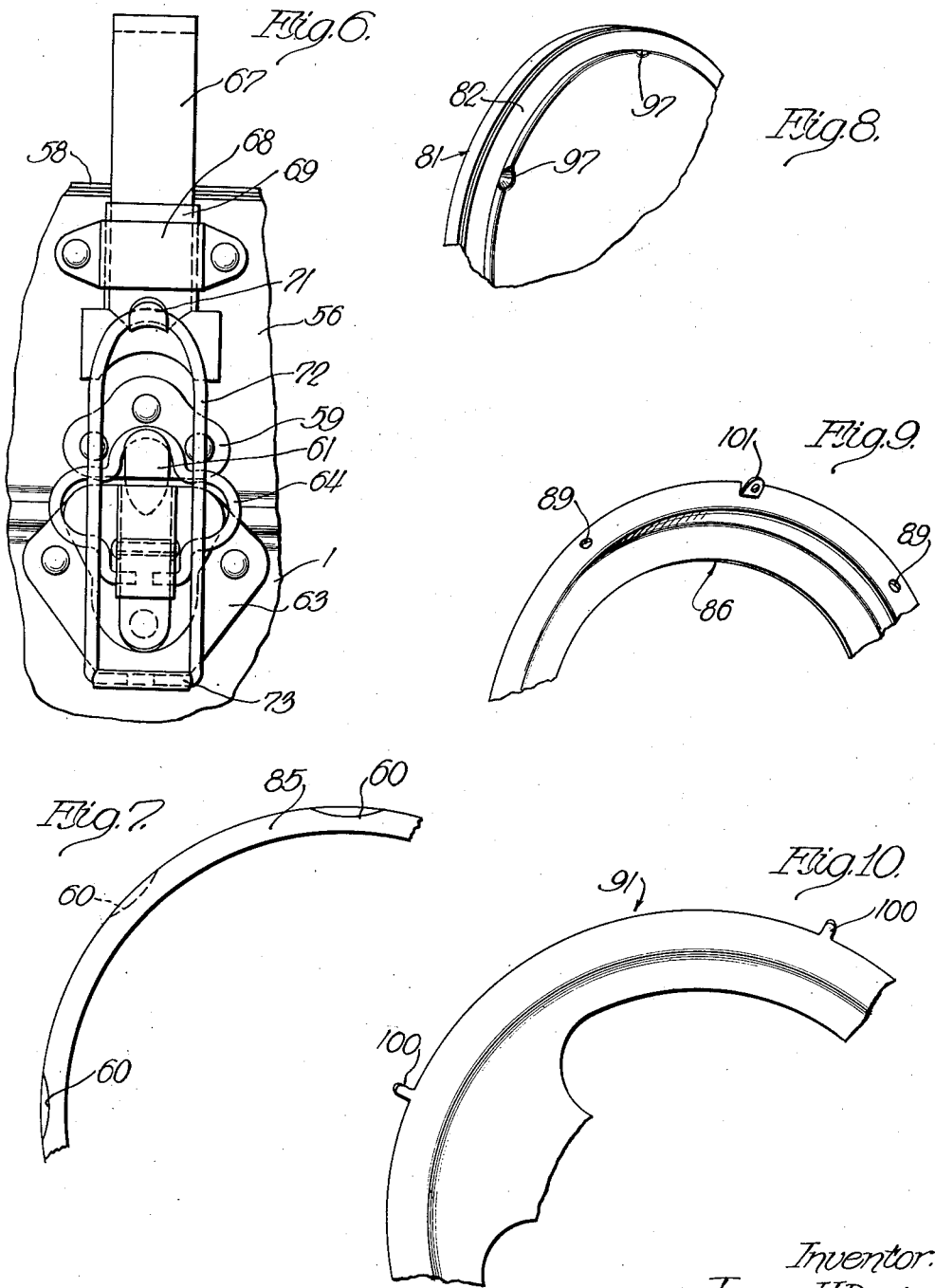
Inventor:
James H. Devine
By Brown, Jackson, Boettcher & Dienner
Att'ys.

Patented Jan. 7, 1936

2,026,967

UNITED STATES PATENT OFFICE 2,026,967

LUNCH BOX

James H. Devine, Ste. Genevieve, Mo., assignor to Dev-Insular Company, St. Louis, Mo., a corporation of Missouri Application November 25, 1932, Serial No. 644,266

29 Claims. (Cl. 206—4)

This invention relates to containers for comestibles, and more particularly to lunch boxes that are thermally insulated in such manner as to retain comestibles in either a hot or cold condition.

Briefly, the present invention comprises a lunch box having an outer casing and an inner casing, the inner casing being disposed within and spaced from the outer casing. A plurality of intermediate casings are disposed in the space between the inner and outer casings and in spaced relation thereto. These intermediate casings are also spaced apart, so that there are a plurality of separate and distinct air chambers for thermally insulating the inner casing from the outer casing. The inner casing is adapted for the reception of a plurality of food tanks, which are held in spaced relation to said casing and thermally insulated therefrom.

Broadly stated, the chief object of the present invention is to provide a device of the character described having high thermal efficiency, so that the conduction of heat from the plurality of food tanks will be reduced to a minimum.

More specifically, it is one of the objects of the present invention to provide means for rigidly supporting and positioning the inner casing and the intermediate casings within and centrally of the outer casing, and thermally insulating them therefrom and from each other.

Another object of the present invention is to provide insulated point contact means for holding the food tanks in spaced relation to the inner casing, so that the point of contact therebetween will be reduced to a minimum, thus greatly reducing conduction of heat between the tanks and the inner casing. In one form of the device, the food tanks seat upon a plate disposed in the inner casing, this plate being provided with point contact means for thermally insulating the tanks from the bottom and side walls of the inner casing. In this form of the device the food tanks are insulated and supported out of contact with the top of the inner casing, and the cover member therefor, by a single insulated point of support. In another form of the device, the food tanks are supported within the inner casing and insulated from the walls thereof by two centrally located points of support, while in still another form of the invention the food tanks, when in normal position, are suspended within the inner casing and out of contact with the walls thereof by a single centrally located point of suspension.

A further object of the invention is the provision of means whereby two lunch boxes of the character above described may be superposed one on top of the other and secured together, for a purpose that will hereinafter appear.

Still another object of the invention resides in the provision of a new and improved carrying and fastening means for said lunch box, whereby any strains to which the box is subjected while being carried will be imposed upon the lower portion of the outer casing, instead of upon the upper portion comprising the cover of the box, as heretofore.

Still further objects of the invention reside in a new and improved arrangement and construction of the food tanks, and to the provision of means for clamping all of said tanks together to prevent the closure members from being raised from said tanks by reason of any entrapped air.

Another object of the invention resides in the provision of means for creating a partial vacuum within the air chambers, disposed between the plurality of walls of the lunch box and the closure member therefor.

A still further object of the invention is the provision of a device of the character described that is highly sanitary, and one in which the removable parts thereof can be readily assembled or disassembled.

Other objects and advantages of the invention will appear from the following detailed description when taken in connection with the accompanying drawings, in which:

Figure 2 is a fragmentary vertical sectional view showing a modified manner of supporting the food tanks within the inner casing;

Figure 3 is a fragmentary vertical sectional view of a lunch box similar to that shown in Figure 1, and in which the intermediate casings, as well as the intermediate horizontal walls of the closure member, between the inner and outer casings have been omitted, and the space therebetween filled with a suitable heat insulating material;

Figure 4 is a fragmentary vertical sectional view of two lunch boxes of the type illustrated in Figure 1, showing the manner in which they may be connected together for picnic use, one of the boxes to contain cold foods and the other box to contain hot foods;

Figure 5 is a vertical sectional view through a lunch box of the present invention, illustrating the manner of suspending the food tanks within the inner casing by a single centrally located point of suspension, parts of the box being similar to that shown in Figure 1, and omitted for the sake of clearness;

Figure 6 is a front elevational view of one of the fastening devices for securing the cover to the box;

Figure 7 is a fragmentary plan view of one of the gaskets for the closure members of the food tanks;

Figure 8 is a partial perspective view of one of the closure members for the food tanks;

Figure 9 is a fragmentary perspective view of one of the plates between which the food tanks are clamped; and Figure 10 is a fragmentary plan view of the other plate between which the food tanks are clamped.

Figure 1:
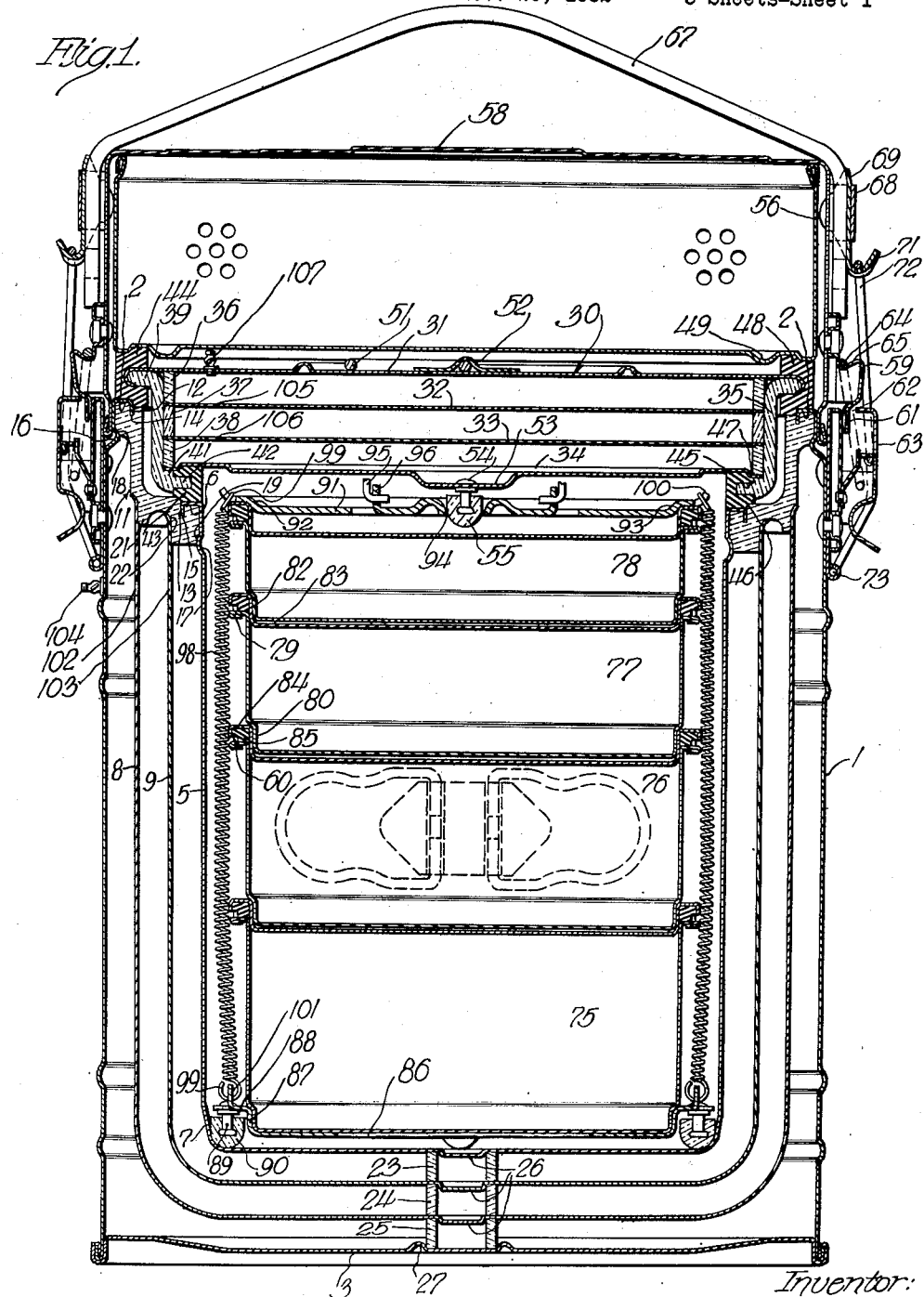
Figure 1 is a vertical sectional view through a lunch box constructed in accordance with my invention.

In constructing a lunch box according to my invention, I provide an outer casing 1 of generally cylindrical shape, although it may be constructed in any desired form without departing from the spirit of the present invention. This casing may be formed of any suitable material, although I preferably use sheet aluminum. The outer surface of the casing may be painted, or finished in any suitable manner or, if desired, the outer surface of the casing may be covered with leather, or other suitable material, so as to present an attractive appearance.

At its upper end, the casing 1 is open and the marginal edge thereof is bent inwardly and downwardly to form a channel 2, while at its lower end the casing is closed by a bottom wall 3 and has its lower marginal edge bent outwardly and upwardly to form a channel 4. The marginal edge of the bottom wall 3 of the casing is bent about the channel 4 and extends downwardly thereinto, as shown, thereby forming a seam for securing the bottom wall 3 to the casing.

Within the casing 1 I dispose an inner casing in the form of a liner 5, preferably formed of aluminum. This casing or liner is spaced from the outer casing and has its upper marginal edge bent outwardly and downwardly to form an annular channel 6. Adjacent its lower end the liner 5 is sloped inwardly slightly, as indicated at 7.

Disposed within the space between the outer casing 1 and the liner 5 are two intermediate casings 8 and 9, the casing 9 being disposed within the casing 8 and spaced from the walls thereof. These casings are also spaced from the inner liner 5 and the outer casing 1, and are for the purpose of dividing the space between the liner and casing into separate and distinct air chambers for reducing the cyclone effect of the air currents therein.

At their upper ends the liner 5 and the intermediate casings 8 and 9 are spaced apart and firmly secured to the outer casing 1 by means of a collar 11. This collar, which is of substantially Z shape, may be formed of any suitable heat insulating material and is of such size as to have a sliding fit with the inner surface of the side wall of the outer casing. The outer casing 1 is secured to the collar 11 by the downwardly extending portion 12 of the channel 2, and the inner liner 5 is secured to said collar by the downwardly extending portion 13 of the channel 6. These portions 12 and 13 extend downwardly into channels 14 and 15, respectively, formed in said collar, and are firmly secured therein by a suitable cement. Preferably, the outer casing 1 is provided with an inwardly-pressed bead 16, and the liner 5 is provided with an outwardly pressed bead 17. These beads abut shoulders 18 and 19, respectively, formed on said collar, and prevent the collar from moving downwardly in the outer casing and thereby withdrawing the portions 12 and 13 from their respective channels in the collar. The intermediate casings 8 and 9, at their upper ends, abut shoulders 21 and 22, respectively, formed on the collar and are secured thereto by a suitable cement.

At their lower ends the liner 5 and intermediate casings 8 and 9 are supported and spaced apart by a plurality of vertically and axially aligned annular rings 23, 24 and 25, which are preferably formed of any suitable heat insulating material. As shown, the ring 23 is disposed between the liner 5 and the intermediate casing 9, and the ring 24 is disposed between the intermediate casing 9 and the intermediate casing 8, while ring 25 is disposed between the intermediate casing 8 and the bottom wall 3 of the outer casing 1. The rings are preferably cemented to their respective casings by a suitable cement. Preferably, the bottom wall of each of the casings 8 and 9 and the liner 5 is provided with a centrally depressed portion 26 which extends downwardly for a short distance into its respective ring. The bottom wall 3 of the outer casing is also provided with an inwardly pressed annular bead 27 which abuts the outer side wall of the annular ring 25. The bead 27 and the depressed portion 26 of the casings and the liner prevent lateral movement of said rings.

In assembling the lunch box the collar 11, the intermediate casings 8 and 9, and the liner 5 are inserted into the outer casing through the bottom thereof. The bottom wall of the outer casing is then secured to said casing, under pressure.

A closure member, designated generally by the reference character 30, is associated with the collar 11 and serves to thermally insulate the open upper end of the liner 5 from the outer casing 1. This closure member comprises four horizontally disposed walls designated as 31 to 34, inclusive, and a vertically extending side wall 35 of substantially Z-shape. The upper and lower walls 31 and 34 are preferably formed of sheet aluminum, and the walls 32 and 33 are preferably formed of aluminum foil. These walls are spaced apart by means of annular rings 36, 37 and 38, which are disposed between the walls 31—32, 32—33, and 33—34, respectively, as shown, and secured thereto by a suitable cement. The marginal edge of the upper wall is bent over the outer periphery of the arm 39 of the Z-shaped side wall 35 of the closure member, and secured thereto by a suitable cement. The lower wall 34 of the closure member 30 is confined between the lower surface of the annular ring 38 and the upper surface of the arm 41 of the vertical side wall 35. The arm 41 of the side wall 35 is reduced as shown at 42, and extends into a substantially U-shaped annular gasket 43, while the arm 39 also extends into a similar gasket 44. These gaskets are preferably formed of rubber, or other suitable resilient heat insulating material and are of symmetrical construction. The gasket 43 seats upon the collar 11 and the channel 6 of the inner liner 5, and is reduced at 45 to abut shoulders 46 and 47 formed on the collar 11 and on the bottom wall 34 of the closure member, respectively. Gasket 44 seats upon the collar 11 and the channel 2 of outer casing 1 and is also reduced at 46 so as to abut the downwardly extending portion 12 of channel 2 and a depressed bead 49 formed on a food tray 56. This food tray 56 will be hereinafter more fully described. A bail 51 is secured to the upper wall 31 of the closure member by means of straps 52, which are secured to said wall as by welding or in any other suitable or preferred manner. This bail provides a handle for removing from and placing the closure member 30 within the box. It will also be noted that the bottom wall 34 of the closure member is provided with a centrally located depression 53 having a rivet or button 54 depending therefrom and secured thereto in any suitable or preferred manner. This rivet or button has secured thereto a knob 55 of suitable heat insulating material, for a purpose that will hereinafter appear.

The food tray 56 seats upon the gasket 44 and is prevented from moving laterally by reason of the depressed beads 49 and 49a, which abut the shoulders formed by the reduced portion 48 of the gasket and the inner wall of said gasket, respectively. The food tray is preferably formed of aluminum and is adapted to contain articles of food such as pies, cakes, etc. Preferably, a plurality of vent holes 57 are provided in the side wall of the tray to permit circulation of air therethrough, so that food contained therein will not become moldy.

The open end of outer casing 1 is closed by a cover 58 preferably formed of aluminum and provided with a plurality of vent holes. This cover 58 is provided with bosses 59, having depending tongues 61, secured to said cover in any suitable or preferred manner. The tongues 61 engage in recesses 62 formed in fastening devices 63 which are secured to the outer casing 1 in any suitable or preferred manner. The fasteners 63 are provided with a bail 64 pivotally secured to the fastener and adapted to engage in recesses 65 formed in the bosses 59 and to exert downward pressure thereon. Bosses 59 and fastening devices 63 serve to secure the cover 58 on the outer casing and also to assure tight closure of said cover by downward pressure. The food tray 56 is of sufficient height to contact the under surface of the top wall of the cover 58, so that downward pressure on the cover will be transmitted to said tray and through the tray to the closure member 30, thereby insuring that closure member 30 will be firmly pressed downwardly upon the inner container 5 to assure a steam-tight fit therewith.

The bail 64 is preferably of the form shown in Figure 6 and is in the nature of a spring bail which will serve to compensate for any wearing of the gasket on the closure member and to maintain said gaskets firmly seated in their aforementioned positions.

The cover 58 is provided with a handle 67 in the form of a leather strap, which has sliding movement beneath metal straps 68, suitably secured to the side wall of the cover 58 of the outer casing 1. A metal plate 69 is suitably secured to said handle 67 and is provided with an upturned lip 71. A bail 72 is pivotally secured at 73 to the fastening device 63 and, at its upper end, is adapted to engage in the recess formed by the upturned lip 71. The pivotal connection of the bail 72 with the fastener 63 is preferably such that the bail will be normally retained in an upright position. As the handle 67 is free to slide beneath the strap 68, when the cover is placed on the box it is only necessary to push the handle downwardly until the lip 71 passes under the upper loop of the bail 72, whereupon an upward pull on the handle will cause the bail 72 to engage within the recess formed by the lip 71. It will be noted that by reason of the foregoing structure the entire weight of the box, when being carried, will be imposed on the box itself instead of on the cover, as heretofore.

Disposed within the inner liner 5 are a plurality of containers or food tanks 75, 76, 77, and 78. These tanks may be constructed of any suitable material, depending largely upon the characteristics of the substance to be placed in the tanks. Under ordinary conditions, these tanks may be constructed of sheet aluminum. Each of the tanks, adjacent their upper open end, are provided with an outwardly extending annular flange 79, and adjacent their lower end are reduced in diameter to provide a shoulder 80. A closure member 81 having upwardly extending side walls 82 forming a depression 83 is provided for each of the tanks. The side walls of the closure member are adapted to extend downwardly into the tank in abutting relation to the inner surface of the side walls of the tank and to have a loose fit therewith. The marginal edges of the walls 82 of the closure member are turned outwardly and then downwardly to form a channel 84 for the reception of a gasket 85. This gasket is preferably of rubber and is adapted to seat upon the flange 79 of the food tank, when the closure member is put in place thereon, and to provide a steam-tight fit between the tank and the closure member. Preferably a plurality of notches 60 are formed in the gasket 85 to facilitate inserting an instrument between the channel 84 of the closure member and the flange 79 of the food tank for removing the closure member from the tank, the gasket being retained, of course, in the channel 84 and being removed with the closure member. The tanks are adapted to be stacked one upon the other, as shown, with the shoulder 80 of one tank disposed in the depression 83 of the closure member of the tank upon which it is stacked. The shoulder 80 seating within the depression 83 serves to prevent disarrangement of the tanks within the inner liner 5 and to prevent movement of said tanks off of each other. The gaskets 85, as well as the tanks and the closure members therefor, are of symmetrical construction and are each readily interchangeable with each other.

The food tanks are supported within and spaced from the walls of the inner liner 5 by a metal plate 86, preferably formed of sheet metal. This plate is provided with upwardly extending side walls 87 and an outwardly extending annular flange 88. The annular flange 88 has a plurality of depending rivets 89 suitably secured thereto, each of such rivets being provided with a knob of heat insulating material 90. These rivets 89 and knobs 90 form feet, or legs, which seat upon the bottom wall of the inner liner 5, and in abutting relation with the sloping portion 7 of said liner, and serve to support the main body portion of the plate out of contact with said liner. The shoulder 80 of the food tank 75 seats within the side walls 87 of the plate 86 and is prevented from moving off of said plate by reason of such wall.

To support and space the food tanks from the closure member 30 and from the upper side wall of the inner liner, a plate 91 is seated upon the upper food tank 78. This plate is preferably formed of sheet metal and is provided with an annular shoulder 92 and an outwardly extending annular flange 93. The shoulder 92 abuts the inner surface of the wall 82 of the closure member 81 and is thereby prevented from moving off of said closure member. A centrally disposed opening 94 is provided in the plate 91 and is adapted to receive the knob 55, of heat insulating material, which extends therethrough. This knob provides point contact insulating means between the closure member 30 and the food tanks. A bail 95, pivotally secured in the upturned lugs 96, formed on said plate 91, serves to facilitate removal of the plate from the tank 78, and also facilitates removal of the nested food tanks from the inner liner 5.

It has been found that when the food tanks 75 to 78, inclusive, have been filled with hot food and placed in the inner container 5 for any period of time, that the closure members of such tanks have a tendency to raise off of the tanks, thereby permitting escape of steam into the space between the tanks and the inner liner and impairing the insulating value of such space. The reason for the closure members raising off of their respective tanks has been attributed to the fact that when the closure members are placed on the tanks a certain amount of air is entrapped and compressed therein. This entrapped air is heated by the hot food, which expands the air and builds up a pressure in the tank, with the result that the closure members are raised off of the tanks. In order to overcome this difficulty I have provided the side walls 82 of the closure members 81 with a plurality of flutes or notches 97. These flutes permit escape of sufficient air from the tank to prevent compressing of the air therein, by the act of placing the closure members on the tanks so that when any air that is in the tanks expands it will not raise the closure members off of the tanks. Furthermore, as the air and the hot food cools the amount of air in the tanks will be reduced below that which was originally entrapped in the tanks, with the result that a partial vacuum will be formed within the tank to hold the closure member thereon. To further assure a positive steam-tight fit of the closure members with their respective tanks, I have provided suitable means for clamping the tanks together. Such means comprises the springs 98, which are formed with a loop 99 at each end thereof. These springs are ordinary tension springs, the loops of which engage over upturned lugs 100 and 101, formed on the plates 86 and 91, respectively. The springs tend to draw the plates together and to clamp the food tanks therebetween.

I have found that if a partial vacuum can be secured in the spaces between the walls 1, 8, 9, and 5 of the box, and in the spaces between the walls 31 to 34, inclusive, of the closure member 30, that the insulating value of such spaces can be greatly increased. I have, therefore, provided each of the casings 8 and 9 with openings 102 and 103 and secured a pet cock 104 to the outer casing 1. In the closure member 30 the walls 32 and 33 are provided with openings 105 and 106, and a pet cock 107 is secured to the outer wall 31 of said closure member. I find that by opening the pet cocks and then filling the inner liner 5 full of boiling water and placing the closure member in place on the liner, the air in the spaces between the walls of the liner 5 and casing 1 and the air in the spaces between the walls of the closure member 30 can be expanded and partially driven out through the pet cocks 104 and 107, respectively. By closing such pet cocks and removing the water from the inner liner a partial vacuum will be secured in the spaces above described by the cooling of the container, as a whole. It will also be noted that a partial vacuum will be formed in the inner liner itself after the water is removed therefrom, the hot food tanks placed therein, and the closure member 30 seated upon the collar 11. The hot liner and the hot nested food tanks rarifies the air within the liner 5, such air being confined therein by the closure member 30. The partial vacuum develops within the liner by the cooling of the rarified air, as well as the cooling of the box as a whole. If desired, a pump can be connected to the pet cocks 104 and 107 to partially exhaust the air between the walls of the box and the walls of the closure member.

While the device of Figure 1 has been disclosed as employing air as the insulating medium in the space between the outer casing 1 and the liner 5, and in the space between the walls 31 and 34 of the closure member 30, such space can be filled, if desired, with any other suitable heat insulating medium. It will be noted from Figure 3, that in employing any other heat insulating medium the intermediate casings 8 and 9 are removed from the box and the walls 32 and 33 are removed from the closure member. The insulating medium 108 is then packed in the space between the liner 5' and the outer casing 1' of the box and, in the space between the walls 31' and 34' of the closure member. The box is similar in all other respects to the box disclosed in Figure 1. If desired, however, the three rings 23, 24, and 25 of the box of Figure 1 can be a single unitary ring. This also applies to the rings 36, 37, and 38 of the closure member 30.

In Figure 2 I have disclosed a modified manner of supporting the food tanks within the inner liner. In this form of the device the bottom wall of the food tanks are provided with an upwardly pressed socket 109. The rivets 89 and insulating knobs 90 are omitted from the plate 86' and the plate is provided with a central opening 110. A rivet 111 is suitably secured to the depression 26' of the inner liner 5' and extends upwardly therefrom through the opening in said plate 86'. A knob of heat insulating material 112 is suitably secured to said rivet and extends into the socket 109 in the bottom food tank 75'. This rivet and knob serves as a means for supporting the food tanks centrally in the liner 5 and for spacing them from the side walls thereof. The stack of tanks is supported at the top in the same manner heretofore disclosed in connection with the tanks of Figure 1. It will be apparent, therefore, that the tanks are supported in and spaced from the walls of the inner liner by two centrally located points of support.

In Figure 4 I have shown the manner of connecting together two lunch boxes of the type disclosed in Figure 1. A box so arranged is particularly adaptable for picnic use, it being contemplated packing one of the boxes with hot food and the other with cold food. Each of the boxes is of substantially the same construction as the box disclosed in Figure 1. However, in the lower box 113 the food tray 56 has been omitted. In the upper box 114 the bottom wall 3' thereof has been constructed similar to the bottom wall of the food tray 56, being provided with a depending annular bead 49b, and the side wall of the outer casing 1' has been extended below such wall to a point adjacent the inwardly pressed bead 16' of the lower box 113. The bottom wall 3' of the upper box 114 seats upon the gasket 44' of the lower box and with the bead 49' thereof engaging the inner surface of the gasket 44'. This bead, together with the downwardly extending portion 137 of the bottom wall 3', prevents lateral movement of the upper box with respect to the lower box. The lower box 113, adjacent its open upper end, is provided with fastening devices 63' which are secured to the outer casing in any suitable or preferred manner. These fastening devices are provided with recesses 62', in which engage tongues 61' formed on bosses 59'. The bosses 59' are secured to the outer casing of the box 114 adjacent its lower end, in any suitable or preferred manner. A bail 64', similar in construction to the bail 64 of the device of Figure 1, is pivotally connected to the fastening devices 63' and is adapted to engage in recesses 65' formed in the bosses 59' and to exert downward pressure on the bosses when in operative position. The fastening devices 63' are also provided with a bail 72' pivoted thereto at 73'. This bail extends from the fastening device on the lower box 113 and at its upper end engages in a recess formed by the upturned lip 71'. This lip 71', as well as the handle 67', is of substantially the same construction as has heretofore been disclosed in connection with the device of Figure 1. It will be apparent from the foregoing description that the weight of the two boxes as a whole is carried by the fastening devices 63' of the lower box and the bail 72' thereof.

In the modified form of the device illustrated in Figure 5, the outer casing and the intermediate casings of the lunch box have not been shown, inasmuch as they are of substantially the same construction as the box disclosed in Figure 1. The inner liner 5b is also of substantially the same construction as the liner 5 as shown in Figure 1.

The food tanks 75a to 78a, inclusive, are suspended in the inner liner 5b by a single centrally located point of suspension. This suspension comprises a shell 115, the marginal edges of which are adapted to seat on a shoulder 116 formed by the outwardly pressed bead 17' of the inner liner. This shell is preferably formed of aluminum and has a relatively snug fit with the inner surface of the walls of the inner liner. The shell is pressed upwardly as shown at 117 to provide a recess 118. This recess is adapted for the reception of a head 119 of a depending support 120. The plate 91' which seats upon the closure member 81' of the upper food tank 78a, is also pressed upwardly at 121 and provided with a central opening 122. The under surface of the plate 91' has a metal plate 123 suitably secured thereto as by means of rivets 124, this plate being provided with a depression 125. The depression 125 of plate 123 and the upwardly extending portion of the plate 91' form a receptacle which is adapted to receive a block of suitable resilient heat insulating material 126. The depending support 120 extends through the opening 122 in the plate 91' and is secured in the block of heat insulating material 126. The tension springs 98' serve to secure the tanks in nested relation to the plate 91', and the plate 91' is secured to the shell 115 by means of a recessed cap 127. A machine screw 128 formed in the recess of the cap 127 screws into the head 119 of the depending support 120 for securing said support to said shell 115. The cap 127 is provided with an annular groove 129, this groove having a retaining band 130 engaging loosely therein. The band 130 is secured to the shell 115 in any suitable or preferred manner, as by means of the chain 131. The shell 115 is also provided with upturned lugs 132 to which is pivotally secured a bail 133. This bail serves as a means for removing or inserting the shell 115 and the nested food tanks from or into, respectively, the inner liner 5b. The lower ends of the nested food containers are insulated from the side walls of the inner liner 5b by buttons of heat insulating material 134. These buttons have a pin or rod 135 suitably secured therein, this rod extending to the plate 86a, to which it is secured in any suitable or preferred manner. It will be noted, however, that with the box in its normal upright position, the buttons 134 do not contact the inner liner, the tanks being suspended within the liner by a single centrally located point of suspension. The construction of the food tanks is substantially the same as hereinbefore disclosed, and need not be further described here.

The individual metal surfaces of the various parts of the box as a whole are to be given any suitable finish, such as a high polish.

As will be understood by those skilled in the art, while I have shown several preferred embodiments of my invention, I do not wish to be limited thereto, since changes may be made therein without departing from the spirit and scope of the invention.

What I claim is:

1. In a device of the character described, an outer casing, a liner within the casing and thermally insulated therefrom, a collar having a plurality of channels formed on the upper surface thereof associated with said casing and said liner, and means on said casing and liner extending into the channels in said collar for securing said collar to said casing and said liner.

2. In a device of the character described, an outer casing, a liner within the casing and thermally insulated therefrom, a substantially Z-shaped collar having a plurality of channels on the upper surface thereof and associated with said casing and said liner, and means on said casing and liner extending into the channels in said collar for securing said collar to said casing and said liner.

3. In a device of the character described, an outer casing, a liner within the casing, a plurality of intermediate casings disposed between said casing and said liner, and a collar associated with said casing and liner and said intermediate casings, said casing and liner being secured to the upper surface of said collar and said intermediate casings being secured to the under surface of said collar.

4. In combination, in a device of the character described, an outer casing, a liner secured within the casing and thermally insulated therefrom, a plurality of tanks disposed in said liner, means comprising a plate supporting said tanks within the liner, an outwardly extending annular flange formed on said plate, and means secured to said flange for supporting said plate within said liner, said last named means including means for insulating said plate and said tanks from said liner.

5. In combination, in a device of the character described, an outer casing, a liner secured within the casing and thermally insulated therefrom, a plurality of tanks disposed in said liner, means comprising a plate supporting said tanks within the liner, an outwardly extending annular flange formed on said plate, a plurality of rivets depending from said plate, and insulating means carried by and secured to said rivets, said rivets and said insulating means serving to support said plate and said tanks in said liner and to insulate them therefrom.

6. In combination, in a device of the character described, an outer casing, a liner secured within the casing and thermally insulated therefrom, a plurality of tanks disposed in said liner, and means comprising a single centrally located point of support secured to the bottom wall of said liner for supporting said tanks within said liner, said last named means also including means for insulating said tanks from said liner.

7. In combination, in a device of the character described, an outer casing, a liner secured within the casing and thermally insulated therefrom, a plurality of tanks disposed in said liner, a member secured to the bottom wall of said liner substantially centrally thereof and extending upwardly therefrom for supporting said tanks within said liner, and means secured to said last named means for insulating said tanks from said liner.

8. In combination, in a device of the character described, an outer casing, a liner secured within the casing and thermally insulated therefrom, a closure member for said liner, a plurality of nested tanks disposed in said liner, and means secured respectively to said closure member and to said liner for supporting said tanks within said liner, said means comprising a single centrally located point of support secured to said closure member and a single centrally located point of support secured to said liner, each of said last named means including means for insulating said tanks from said liner and said closure member.

9. In a device of the character described, an outer casing, a liner secured within the casing and thermally insulated therefrom, a plurality of tanks disposed in said liner, and means for suspending said tanks in said liner and for insulating them therefrom.

10. In combination, in a device of the character described, an outer casing, a liner secured within the casing and thermally insulated therefrom, a shell supported by said liner, a plurality of tanks disposed in said liner, and means secured to said shell for suspending said tanks in said liner and for insulating them from said shell and liner.

11. In combination, in a device of the character described, an outer casing, a liner secured within the casing and thermally insulated therefrom, a shell supported by said liner, a plurality of tanks disposed in said liner, means located substantially centrally of said shell and depending therefrom for suspending said tanks in said liner, said means including means for insulating the upper tanks from said shell and said liner, and means associated with said tanks for insulating the lower tanks from said liner.

12. In combination, in a device of the character described, comprising an outer casing, a liner within the casing and thermally insulated therefrom, a plate disposed in said liner, a plurality of nested food tanks seating on said plate, a second plate seating on the closure member of the topmost tank, means connecting said plates for clamping said tanks therebetween, and means associated with said plates for insulating said plates and said tanks from said liner.

13. In combination, in a device of the character described, an outer casing, a liner within the casing and thermally insulated therefrom, a plate disposed in said liner, a plurality of nested food tanks seating on said plate, a second plate seating on the closure member of the topmost food tank, means comprising tension springs connecting said plates for clamping said tanks therebetween, and means associated with said plates for insulating said plates and said tanks from said liner.

14. In combination, in a device of the character described, an outer casing, a liner within the casing and thermally insulated therefrom, a plate disposed in said liner, a plurality of nested food tanks seating on said plate, a second plate seating on the closure member of the topmost food tank, a plurality of upturned lugs formed on each of said plates, means comprising tension springs connected with the lugs on said plates for clamping said tanks therebetween, and means associated with said plates for insulating said plates and said tanks from said liner.

15. In combination, in a device of the character described, an outer casing, a liner within the casing and thermally insulated therefrom, a collar associated with said casing and liner for securing said liner to said casing, a closure member for said liner, and a plurality of gaskets secured to said closure member, said gaskets seating on said collar and having reduced portions forming shoulders for cooperating with shoulders formed on said collar.

16. In combination, in a device of the character described, an outer casing, a liner within the casing and thermally insulated therefrom, a collar associated with said casing and liner for securing said liner to said casing, a closure member comprising a plurality of spaced walls, means for spacing said walls apart, and a plurality of gaskets secured to said closure member, said gaskets seating on said collar and having reduced portions forming shoulders for cooperating with shoulders formed on said collar.

17. In a device of the character described, comprising an outer casing, an inner casing disposed within the outer casing, means securing said inner liner to said casing, a closure member for said liner, said closure member having a plurality of gaskets secured thereto and seating on said collar, a food tray seating on said closure member, a cover for said food tray and outer casing, and means for securing said cover to said casing, said means including means for compensating for wear of said gaskets to assure of a steam tight fit of said gaskets with said collar.

18. In a device of the class described, a thermally insulated container, a cover for said container, means for securing said cover to said container, a handle for said container, said handle being secured to said cover and having translational movement with respect thereto, a bail associated with said cover securing means and means on said handle engageable with said bail upon upward translational movement of said handle.

19. In a device of the class described, a thermally insulated container, a cover for said container, means for securing said cover to said container, a handle for said container, said handle being secured to said cover and having translational movement with respect thereto, and a bail secured to said cover securing means and an upturned lip disposed on the outer end of said handle and engageable with said bail upon upward translational movement of said handle.

20. In a device of the class described, a receptacle, and a closure member for said receptacle, said closure member having means arranged for permitting escape of air from said receptacle at the instant the closure member is placed thereon, the closure member thereafter forming a sealed connection with said receptacle to prevent escape of air from said receptacle through said last named means.

21. In a device of the class described, a receptacle, and a closure member for said receptacle, said closure member having means formed on the side walls thereof for permitting escape of air from said receptacle at the instant closure member is placed thereon, the closure member thereafter forming a sealed connection with said receptacle to prevent the escape of air from said receptacle through said last-named means.

22. In a device of the class described, a receptacle and a closure member for said receptacle, said closure member having means for permitting escape of air from said receptacle at the instant the closure member is placed thereon, and a gasket carried by said closure member and having a plurality of notches formed therein, said gasket forming a sealing connection between the closure member and the receptacle and preventing escape of air from the receptacle through said last-named means after the closure member has been seated on the receptacle.

23. In a device of the character described, an outer casing, a liner within the casing, a plurality of intermediate casings disposed between said outer casing and said liner, a collar disposed between the outer casing and liner, means securing said collar to said outer casing and liner and arranged to prevent upward movement of said collar with respect thereto, and means securing said collar to said intermediate casings and arranged to prevent downward movement of said collar with respect to said outer casing and liner.

24. In a device of the character described, an outer casing, a liner within the casing, a plurality of intermediate casings disposed between said outer casing and said liner, means associated with and securing and spacing the upper portions of said casings and liner apart, and a plurality of annular rings supporting and spacing the bottom portions of said casings and liner apart.

25. In a device of the character described, an outer casing, a liner within the casing, a plurality of intermediate casings disposed between said outer casing and said liner, means associated with and securing and spacing the upper portions of said casings and liner apart, and a plurality of vertically and axially aligned annular rings interposed between the casings and liner for supporting and spacing the bottom portions of said casings and liner apart.

26. In combination, in a device of the character described, an outer casing, a liner secured within the casing and thermally insulated therefrom, a plurality of tanks disposed in said liner, and means comprising a single centrally located point of support projecting upwardly from the bottom wall of said liner for supporting and spacing said tanks from said liner.

27. In a device of the character described, an outer casing, a liner secured within the casing and thermally insulated therefrom, a plurality of superposed tanks disposed in said liner, and means comprising a single centrally located point of suspension for suspending said tanks in said liner.

28. In combination, in a device of the character described, an outer casing, a liner within the casing and thermally insulated therefrom, a plurality of superposed food tanks disposed in said liner, means yieldingly urging said tanks together, and means supporting and spacing said last-named means and said tanks from said liner.

29. In combination, in a device of the character described, an outer casing, a liner secured within the casing and thermally insulated therefrom, a closure member for said liner, a plurality of nested tanks disposed in said liner, and means supporting said tanks within said liner, said means comprising a single centrally located point of support associated with said closure member and said tanks, and a single centrally located point of support associated with said tanks and said liner.

JAMES H. DEVINE.